United States Patent
Barber et al.

(10) Patent No.: US 6,240,521 B1
(45) Date of Patent: May 29, 2001

(54) SLEEP MODE TRANSITION BETWEEN PROCESSORS SHARING AN INSTRUCTION SET AND AN ADDRESS SPACE

(75) Inventors: Ronald Jason Barber, San Jose; Edwin Joseph Selker, Palo Alto, both of CA (US)

(73) Assignee: International Business Machines Corp., Armonk, NY (US)

( * ) Notice: Subject to any disclaimer, the term of this patent is extended or adjusted under 35 U.S.C. 154(b) by 0 days.

(21) Appl. No.: 09/151,133

(22) Filed: Sep. 10, 1998

(51) Int. Cl.$^7$ .................................................. G06F 1/00
(52) U.S. Cl. ................................................. 713/323
(58) Field of Search ...................... 713/320, 323, 713/324, 300, 321, 340, 322, 501; 714/14; 702/63; 345/212; 710/104, 110; 711/114, 161; 360/71; 712/34, 36, 11; 340/825.2

(56) References Cited

U.S. PATENT DOCUMENTS

| | | |
|---|---|---|
| 4,443,846 | 4/1984 | Adcock . |
| 5,142,684 * | 8/1992 | Perry et al. .......................... 713/320 |
| 5,592,677 | 1/1997 | Intrater et al. . |
| 5,625,828 | 4/1997 | Carmon et al. . |
| 5,666,541 * | 9/1997 | Sellers ................................. 713/324 |
| 5,713,028 | 1/1998 | Takahashi et al. . |
| 5,737,706 | 4/1998 | Seazholtz et al. . |
| 5,740,454 | 4/1998 | Kelly et al. . |
| 5,809,449 * | 9/1998 | Harper ................................. 702/63 |
| 5,886,689 * | 3/1999 | Chee et al. .......................... 345/212 |
| 5,918,061 * | 6/1999 | Nikjou ................................. 713/324 |
| 5,926,404 * | 7/1999 | Zeller et al. ......................... 713/321 |
| 6,035,408 * | 3/2000 | Huang .................................. 713/320 |
| 6,065,123 * | 5/2000 | Chou et al. .......................... 713/322 |

* cited by examiner

*Primary Examiner*—John A. Follansbee
*Assistant Examiner*—Walter Benson
(74) *Attorney, Agent, or Firm*—Robert Buckley

(57) ABSTRACT

An information processing system includes at least two processors sharing a common instruction set and address space. One processor at a time is active and executes program instructions. The active processor is placed into a sleep mode in which a current machine state is saved in the shared address space and instruction execution is suspended. A different processor becomes active and resumes instruction execution using the previously saved current machine state. The sleep mode is used to effectively pass control from one processor to another. In a specific embodiment, the currently active processor will resume operation after a sleep mode unless the user overrides that default selection. In another specific embodiment, the currently active processor selects which processor will become active following a sleep mode transition. In another specific embodiment, different processors share a common instruction set but each has additional unique characteristics, and the currently active processor selects a processor having characteristics matching the requirements of a specific phase of a computational process. In another specific embodiment, a notebook computer has two processors, one being very low-powered for extending battery life, the other being very fast for multimedia presentations and heavy number crunching. A user selects a processor appropriate for the intended use.

6 Claims, 4 Drawing Sheets

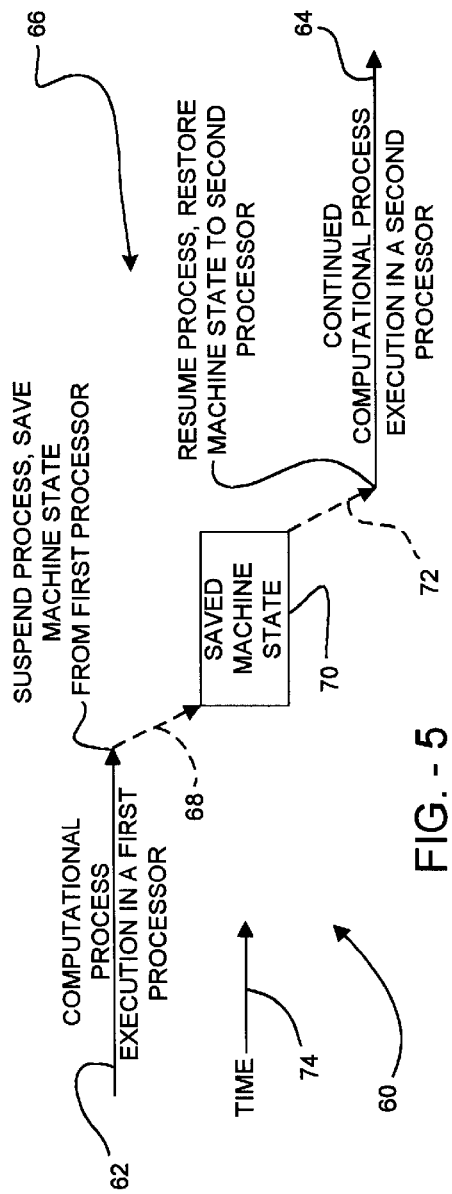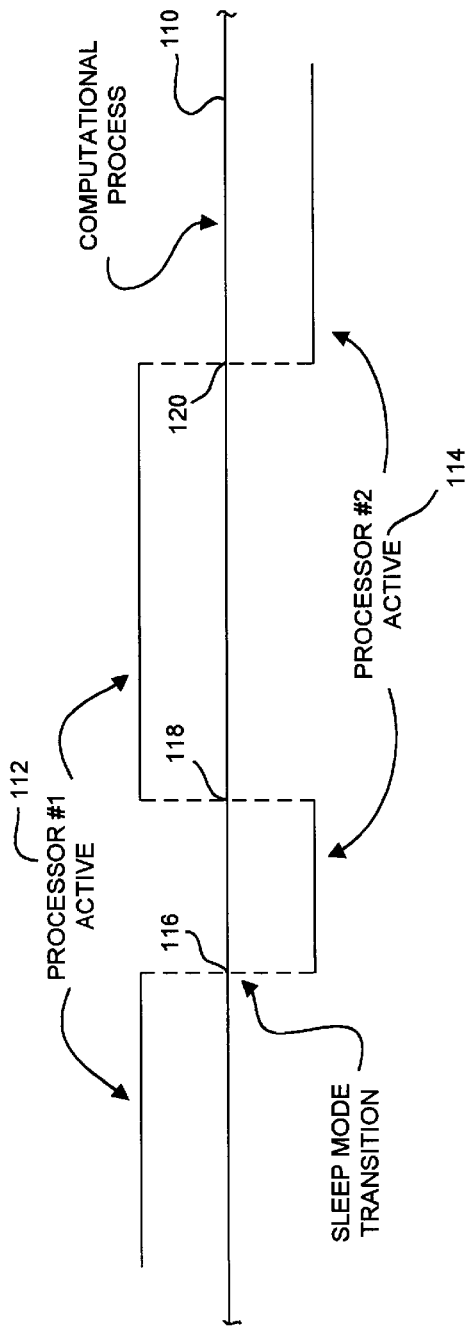

SLEEP MODE TRANSITION BETWEEN PROCESSORS SHARING AN INSTRUCTION SET AND AN ADDRESS SPACE

FIELD OF THE INVENTION

The invention generally relates to information processing systems, and more specifically to power conservation in battery operated computer systems. The invention has a particular applicability to IBM® ThinkPad®) notebook computers. (IBM and ThinkPad are registered trademarks of the International Business Machines Corporation.)

BACKGROUND OF THE INVENTION

Various low-powered operating modes for extending battery life are known in notebook computers and hand-held devices. A sleep mode (also known as a "suspend" mode) permits a user to press a button which places the computer in a very low power configuration in which program execution is suspended. When the button is depressed a second time, the computer resumes execution from the point at which the button was depressed the first time. In some power-conserving operating modes, a computer will enter a sleep mode automatically if there has been no user activity within a defined interval.

In other efforts to extend battery life, computer circuits have been developed which provide reasonable computational speed when operated at reduced voltages. It is fair to say, however that no existing notebook computer offers the combined advantages of low power and high speed.

What is needed is a notebook computer that can operate at extremely low power levels when battery life is at a premium—such as during a long distance flight—and can operate at high speed when computational power is required. The current solution to this problem is to use two computers—a low-powered notebook for an extended flight, and a high-powered notebook or desktop computer for heavy number crunching.

SUMMARY OF THE INVENTION

This need, and others that will become apparent, is met by the present invention which in a specific embodiment provides an information processing system having at least two processors sharing a common instruction set and address space. One processor at a time is active and executes program instructions. The active processor is placed into a sleep mode in which a current machine state is saved in the shared address space and instruction execution is suspended. A different processor becomes active and resumes instruction execution using the previously saved current machine state. The sleep mode is used to effectively pass control from one processor to another.

In a specific embodiment, the currently active processor will resume operation after a sleep mode unless the user overrides that default selection. In another specific embodiment, the currently active processor selects which processor will become active following a sleep mode transition.

In another specific embodiment, different processors share a common instruction set but each has additional unique characteristics, and the currently active processor selects a processor having characteristics matching the requirements of a specific phase of a computational process.

In another specific embodiment, a notebook computer has two processors, one being very low-powered for extending battery life, the other being very fast for multimedia presentations and heavy number crunching. A user selects a processor appropriate for the intended use.

Another specific embodiment of the invention defines methods for operating an information processing system having plural processors using a sleep mode transition as described above. One specific method requires that the computational process be expressed in shared instructions and address space only. Another specific method permits the software, via the processor selection latch, to specify which processor will be active during various phases of the software, thereby permitting the software to take advantage of individual characteristics of each processor.

A primary advantage of the system is that a low power processor can be used for some tasks, such as word processing, for prolonging battery life, while a powerful high-speed processor can be invoked for tasks such as spread sheets and multimedia presentations. In the past, these combined features required that more than one computer be used. The present invention permits these features to be available in a single computer system.

Another advantage of the described system is that it permits desirable characteristics of similar though different processors to be successfully combined in a single computer. The differing characteristics typically include speed and power, but also permit processors from different manufacturers and having slightly differing characteristics to be combined in a single desktop or notebook computer. This advantage is one not previously available except by using two computers. The two processors must share a common subset of instructions and an address space.

BRIEF DESCRIPTION OF THE DRAWINGS

For a further understanding of the objects, features and advantages of the present invention, reference should be had to the following description of the preferred embodiment, taken in conjunction with the accompanying drawing, in which like parts are given like reference numerals and wherein:

FIG. 5 is a schematic diagram which illustrates a method for operating a computer system according to another aspect of the present invention.

FIG. 7 is a schematic diagram representing a computational process being executed alternatively by each of two processors according to one aspect of the present invention.

DESCRIPTION OF THE PREFERRED EMBODIMENTS

Figure 1:
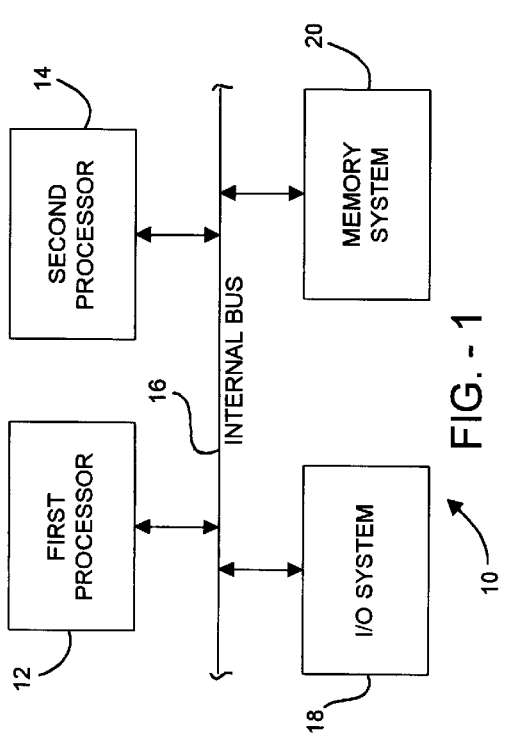
FIG. 1 is a block diagram which illustrates a two processor computer system according to one aspect of the present invention.

With reference to FIG. 1, there is shown a computer system according to one aspect of the present invention. The computer system is designated generally by the reference numeral 10 and includes a first processor 12, a second processor 14, a shared internal bus 16, a shared I/O system 18, and a shared memory system 20.

Both processors 12, 14 share a common instruction set, common I/O system and memory system address space, and each processor includes an active mode and a sleep mode. The computer system 10 includes elements permitting a user to place each processor into its sleep mode, and to selectively activate one processor from the sleep mode to an active mode. The active processor executes program instructions stored in the memory system 20. Both processors can be placed simultaneously in the sleep mode. One processor at a time can be activated to execute program instructions.

Machine State

Figure 2:
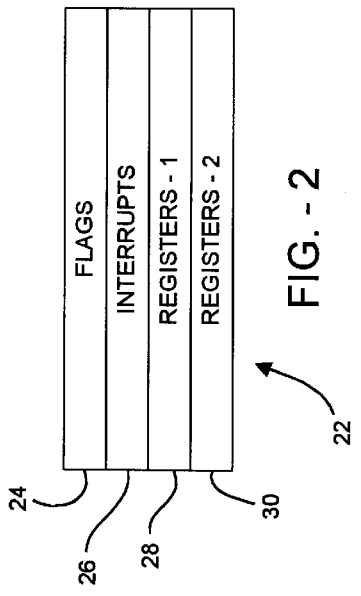
FIG. 2 is a schematic diagram which illustrates a computer machine state.

FIG. 2 is a schematic diagram which illustrates a saved machine state defined for the two processors shown in FIG. 1. The defined machine state is designated generally by the reference numeral 22, and includes saved machine flags 24, saved interrupt flags and masks 26, and saved machine register contents 28, 30.

When an active processor is instructed to suspend execution of program instructions and to enter the sleep mode, the active processor saves its current machine state 22 in a predetermined block of the shared memory system 20 (FIG. 1) before suspending execution and entering the sleep mode.

When both processors are in the sleep mode, and one processor is instructed to leave the sleep mode and to resume execution of the program instructions, that processor obtains the previously saved machine state 22 from the predetermined block of the shared memory system 20, and resumes execution from that machine state.

Process State

There are two "states" of concern: (1) a "machine" state which includes the contents of machine registers, interrupt masks and various flags, and (2) a "process" state, which is represented by the machine state plus the contents of memory, both an internal memory (RAM), and an external memory (DISK). Since the two processors share a common address space, the contents of memory is available equally to both processors (or all processors when there are more than two). It is only the machine state which must be passed back and forth between the active processors via the shared memory and the sleep mode transition. Clearly this "baton" passing can be accomplished without the use of a sleep mode, or at least the sleep mode can be very brief. But in at least one embodiment, in which a user selects which processor shall run, the sleep mode transition is natural and is easy to implement.

Low-Power/High-Speed Combination

In a specific embodiment of the invention, one processor is a high-speed processor and the other is a low-power processor, both sharing a common instruction set and address space. The low-power processor is activated from the sleep mode during battery operation, while the high-speed processor is useful for media intensive and number crunching applications when the computer system can be operated from standard household power. Such an embodiment is illustrated in FIGS. 3 and 4.

Figure 3:
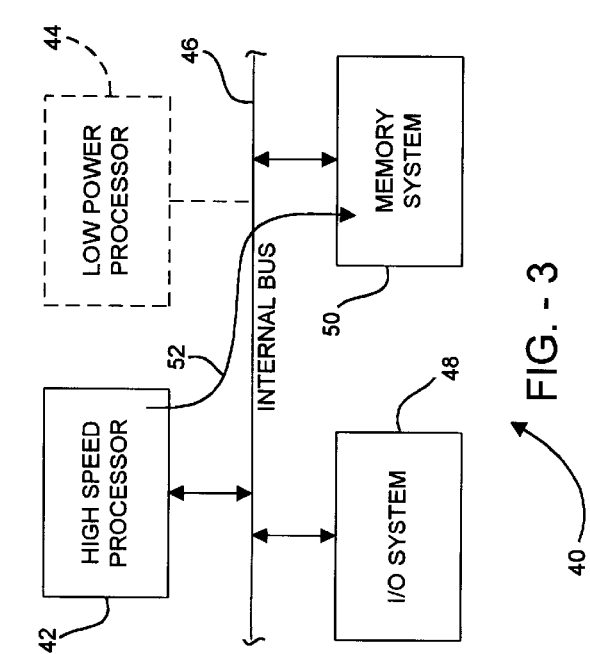
FIG. 3 is a block diagram which illustrates the computer system of FIG. 1 in which an active processor suspends execution of a program, saves its machine state and enters a sleep mode, while a second processor is in a sleep mode.

FIG. 3 is a block diagram which illustrates a specific embodiment of a computer system such as a high-end notebook computer. The computer system is designated generally by the reference numeral 40, and includes a high-speed processor 42, a low-power processor 44, a shared internal bus 46, a shared I/O system 48, and a shared memory system 50. The high-speed processor 42 is shown in a solid box to indicate that the processor 42 is in an active mode, while the low-power processor 44 is shown in a broken line box to indicate that the processor 44 is in a sleep mode. The high-speed processor 42 has been instructed to suspend execution of a program and to enter its sleep mode. As the high-speed processor 42 prepares to enter the sleep mode, it saves 52 the current machine state (22 of FIG. 2) in a predetermined block of the shared memory system 50.

Figure 4:
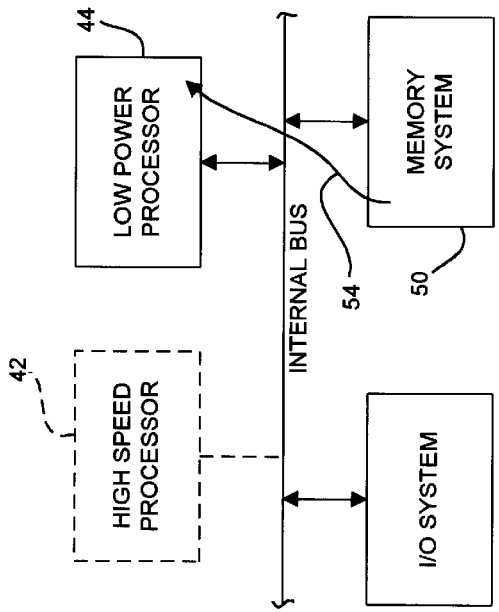
FIG. 4 is a block diagram which illustrates a second processor using a previously saved machine state to come out of the sleep mode and to resume execution of a program while a first processor remains in the sleep mode.

FIG. 4 is a block diagram which illustrates the same embodiment of the computer system shown in FIG. 3. The low-power processor 44 has been commanded to leave the sleep mode, to enter an active mode and to resume the execution of the suspended program. The high-speed processor 42 is in the sleep mode, as indicated by the broken lines. As the low-power processor 44 comes out of the sleep mode, it retrieves 54 the previously saved machine state from the predetermined block of the shared memory system 50, and resumes the execution of instructions of the previously suspended program.

In like manner, the low-power processor 44 can be placed into the sleep mode, and will suspend the execution of the program, save its current machine state in the predetermined block of the shared memory system 50, and enter the sleep mode. The high-speed processor 42 can be aroused from the sleep mode and will retrieve the previously saved machine state from the shared memory system 50 and use that state to resume the execution of the previously suspended program. Alternatively, the low-power processor 44 can be called out of the sleep mode to resume the execution of the program. In this specific embodiment, the program can be executed by either processor, and neither processor need be aware of which processor is active.

FIG. 5 illustrates a computational process executed alternatively by one of two processors, using a sleep mode transition, as described above with respect to FIGS. 1–4. The computational process is designated generally by the numeral 60, and includes a first part 62, a second part 64, and a transitional part designated generally by the numeral 66. The transitional part 66 includes a suspension of execution 68 of the first part, a saving 70 of a machine state, and a subsequent resumption of execution 72 of the second part 64. Time progresses from left to right, as indicated by the arrow 74. The first part 62 of the computational process 60 is illustrated by an arrow and includes execution of process computer instructions by a first processor (not shown). The second part 64 of the computational process 60 is illustrated by an arrow and includes execution of process computer instructions by a second processor (not shown). The figure illustrates how a sleep mode (also known as a suspend mode) is used as a transition between processors within a single computational process. As will be described later, a suspended process is often continued in the same processor.

Though the examples given here are limited to two processors, the scope of the invention includes multiple processors sharing some basic subset of common instructions, a defined machine state, and a shared memory and I/O address space. The processors must also accommodate being placed into a sleep mode from which one processor at a time can be aroused to execute program instructions, and must save a current machine state to, and restore a current machine state from a common block of the shared memory address space.

Processor Selection

Figure 6:
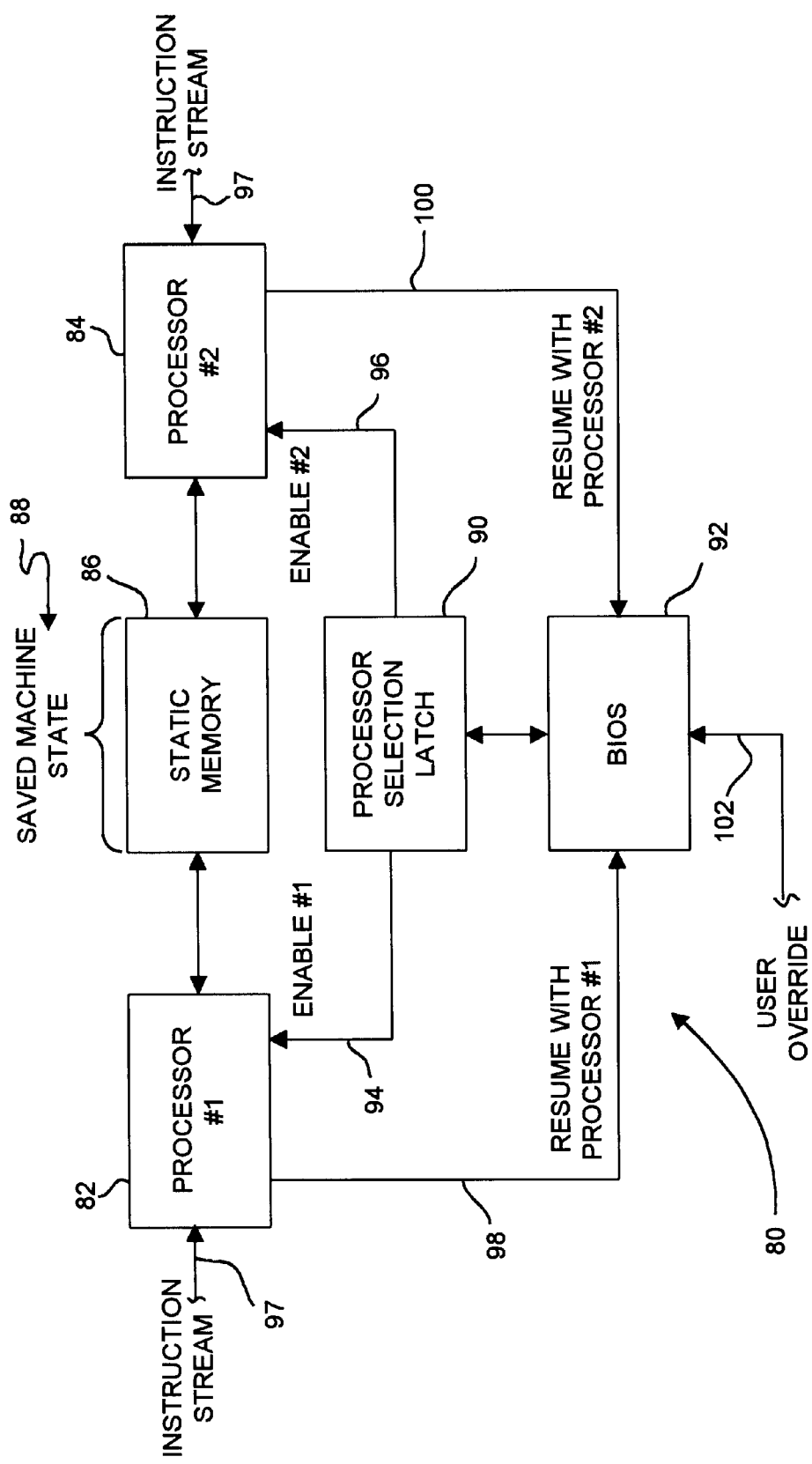
FIG. 6 is a block diagram which illustrates a processor selection latch used in several embodiments of the present invention.

FIG. 6 is a block diagram which illustrates a computer system according to another aspect of the present invention using a BIOS controlled latch for determining which processor comes out of the sleep mode. The computer system is designated generally by the reference numeral 80, and includes a first processor 82, a second processor 84, a static memory 86 for saving a machine state 88, a processor selection latch 90, and a system BIOS 92 for controlling the latch. The processor selection latch 90 provides a signal 94 for enabling the first processor, and a second signal 96 for enabling the second processor. Only one processor enabling signal at a time is active.

The active processor (whichever processor is active, if either) executes instructions of an instruction stream 97 (also known as a "computer program," "stored program," and "program thread"). The same instruction stream is received by both processors, and is executed by an active processor. The first processor 82 uses a line 98 to command the system BIOS 92 to set the processor selection latch 90 for resuming after a sleep mode using the first processor. The second processor 84 uses a line 100 to command the system BIOS 92 to resent the processor selection latch 90 for resuming after a sleep mode using the second processor. Since only one processor is active at a time, no conflict with respect to processor activation will result.

In a specific embodiment of the invention, the default selection is the currently active processor which will be the processor reactivated upon coming out of a sleep mode transition. This behavior is consistent with the manner in which single-processor computers come out of a sleep mode. In another specific embodiment of the invention, a user override 102 is provided so that a user can select which processor comes out of sleep mode. In a specific embodiment of the invention, a decision as to which processor comes out of the sleep mode transition is made before the sleep mode begins. In yet another specific embodiment, the decision is made at the time the sleep mode begins.

System Tuning

FIG. 7 is a schematic diagram which illustrates a single computational process 110 being executed alternatively by a first processor 112 and by a second processor 114.

Sleep mode transitions 116, 118, 120 are used to transfer control between the two processors. In a specific embodiment, there is an overlap of instruction sets and address spaces for the two processors. That is, they share a common subset of instructions, storage locations, and I/O address space, though each processor has features not present in the other processor.

The computational process 110 is written to take advantage of the unique features of each processor. For example, one processor operates at a lower voltage and clock speed and is useful for word processing at extremely low power levels, while the other processor includes a floating point co-processor, a specialized instruction subset permitting rapid processing of graphics information before output to a special graphics chip set, and is capable of operation at very high speed. The user selects that processor that matches the requirements of the phase of the computational process 110 currently being executed.

"System Aware" Software

The applications software for such a system can be of two types. One type, "unaware" software, has no knowledge of the specific characteristics of the individual processors. The other type, "aware" software, knows which processor is active, and knows what are the specific characteristics of each processor.

Unaware software is required to limit its use of instructions and features to those that are common to both processors. Aware software, on the other hand, is able to tailor itself to the specific characteristics of each processor by using its knowledge of which processor is active. The processor enable signals 94, 96 of FIG. 6, for example, provide that type of information.

Figure 8:
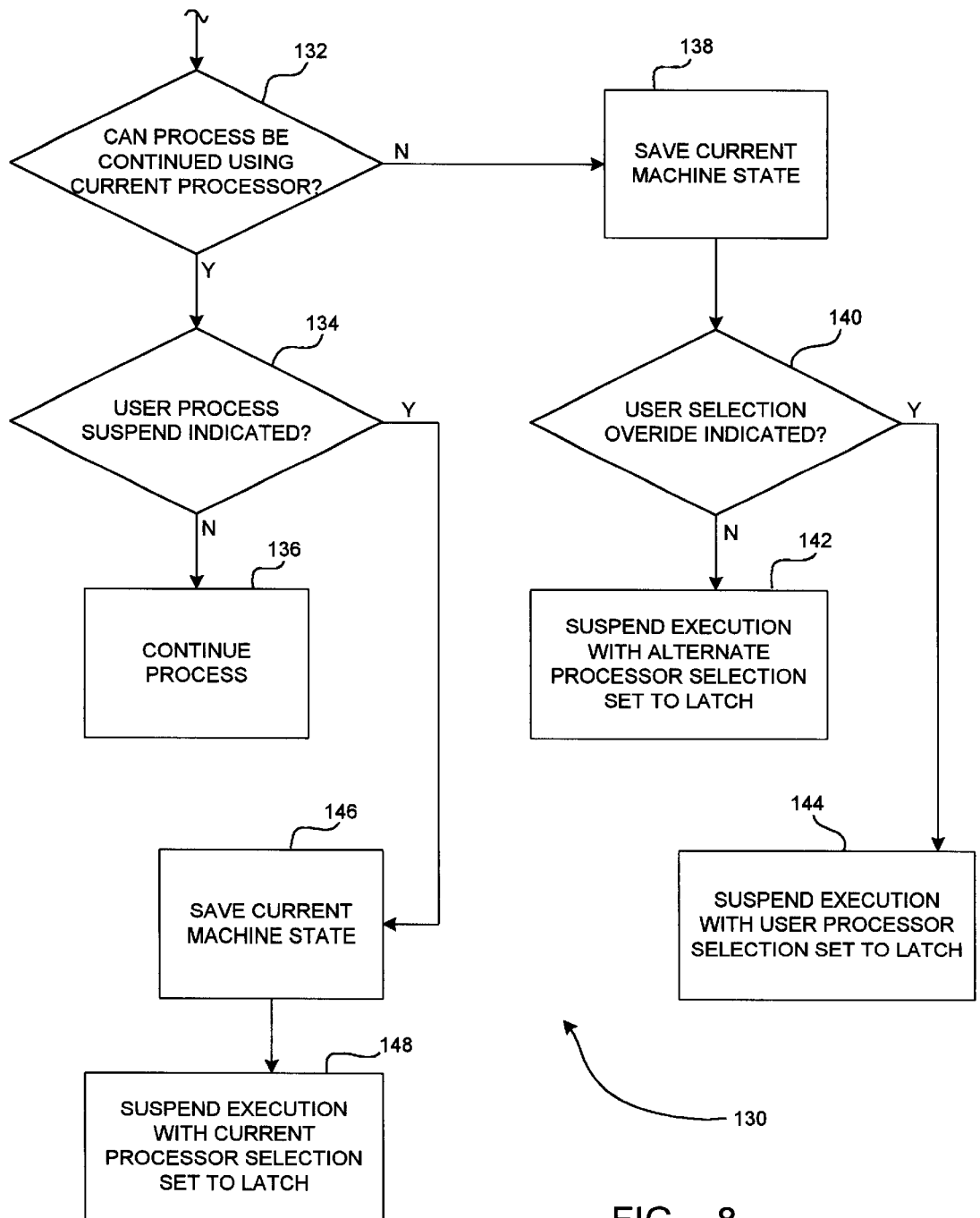
FIG. 8 is a partial program flowchart which illustrates a procedure for determining whether the current processor can continue the computational process and whether a user suspend command has been received.

Another embodiment of the invention defines a method for operating a computer system having plural processors using a sleep mode transition, as previously described. FIG. 8 is a partial flowchart which illustrates a sequence of steps useful by a computational process which (1) has knowledge of the specific characteristics of each processor and which processor is currently active, and (2) seeks to determine whether or not the process can continue by using the currently active processor. Such information is available from a system BIOS, and can be made available from the BIOS via operating system "hooks" whenever a sleep mode is terminated.

The steps in FIG. 8 are designated generally by the reference numeral 130, and include a test 132 of whether or not the computational process can continue by using the currently active processor, and steps to be taken thereafter. If the process can be continued, it tests 134 whether the user has commanded a suspension of activity. If not, the computational process continues 136 using the currently active processor. If on the other hand, the currently active processor cannot continue the computational process, the current machine state is saved 138 in a static memory, accessible to both processors. A test 140 is then performed to determine whether the user seeks to override a computational process decision as to which processor shall resume after a sleep mode transition. If no user override is indicated, activity is suspended 142 and the processor selection latch (90 of FIG. 6) is set to select the alternative processor when activity is resumed. If a user override was indicated, activity is suspended 144 and the processor selection latch is set to the user's choice.

If the user has elected to suspend activity 134, the current machine state is saved 146 in the static memory, and then activity is suspended 148 and the processor selection latch is set to the default value to select the current processor upon resuming activity.

While the invention has been described in relation to the embodiments shown in the accompanying Drawing figures, other embodiments, alternatives and modifications will be apparent to those skilled in the art. It is intended that the Specification be exemplary only, and that the true scope and spirit of the invention be indicated by the following claims.

What is claimed is:

1. A method for operating an information processing system, comprising the steps of:
   providing a hardware platform, including memory, having plural processors sharing a common instruction set, memory address space, and I/O system, and including means permitting a suspend mode to provide a transition between active processors, and means for selecting which processor shall resume program execution;
   providing a stored program for operating the hardware platform, and storing the program in a portion of the shared memory;
   selecting one processor to execute the stored program, the selected processor defining a currently active processor and a current machine state;
   using the suspend mode for suspending execution of the stored program by the currently active processor, and for saving the current machine state in a portion of the memory within the shared memory address space; and resuming execution of the stored program by the currently active processor using the saved machine state to restore the current machine state, whereby the information processing system is operating according to the limitations of the system and the requirements of the stored program.

2. A method for operating an information processing system, comprising the steps of:

providing a hardware platform, including memory, having plural processors sharing a common instruction set, memory address space, and I/O system, and including means permitting a suspend mode to provide a transition between active processors, and means for selecting which processor shall resume program execution;

providing a stored program for operating the hardware platform, and storing the program in a portion of the shared memory;

selecting one processor to execute the stored program, the selected processor defining a currently active processor and a current machine state;

using the suspend mode for suspending execution of the stored program by the currently active processor, and for saving the current machine state in a portion of the memory within the shared memory address space;

permitting the currently active processor to select which processor will resume execution of the stored program; and resuming execution of the stored program by the selected processor and using the saved machine state to restore the current machine state, the selected processor becoming the currently active processor, whereby the information processing system is operating according to the limitations of the system and the requirements of the stored program.

3. A method for operating an information processing system, comprising the steps of:

providing a hardware platform including,
  memory,
  plural processors sharing a common instruction set, memory address space, and I/O system,
  means permitting a suspend mode to provide a transition between active processors, and
  means for selecting which processor shall resume program execution;

providing a stored program for operating the hardware platform, and storing the program in a portion of the shared memory;

selecting one processor to execute the stored program;

the selected processor defining a currently active processor and a current machine state;

using the suspend mode for suspending execution of the stored program by the currently active processor, and for saving the current machine state in a portion of the memory within the shared memory address space;

permitting the currently active processor to select which processor will resume execution of the stored program;

resuming execution of the stored program by the selected processor and using the saved machine state to restore the current machine state, the selected processor becoming the currently active processor;

the provided hardware platform further including, means permitting the currently active processor to save the current machine state and to suspend program execution, and means permitting the currently active processor to determine which processor is currently active;

the provided stored program further including, program means for determining which processor is currently active, and program means for determining whether the currently active processor is able to process a predetermined group of program instructions; and using the determination of ability to process instructions for selecting which processor shall resume program execution, and for saving the current machine state and suspending execution when the currently active processor is unable to process the predetermined group of program instructions, whereby the information processing system is operating according to the limitations of the system and the requirements of the stored program.

4. A notebook computer, comprising:

a low-powered processor;

a high-speed processor;

a memory;

an I/O system;

the two processors sharing a common instruction set, the memory, and the I/O system and defining a stored program computer;

the stored program computer defining a suspend mode, an active mode, a currently active processor, and a current machine state;

at most, one processor at a time is in the active mode;

means for selecting which processor will resume the active mode as the currently active processor following a suspend mode;

means for placing a currently active processor into a suspend mode and for saving a current machine state in the shared memory;

means for placing a selected processor into an active state using the saved machine state to restore a current machine state; and means defining a currently active processor as a default selection of which processor is placed in an active mode following a suspend mode.

5. A notebook computer, comprising:

a low-powered processor;

a high-speed processor;

a memory;

an I/O system;

the two processors sharing a common instruction set, the memory, and the I/O system and defining a stored program computer;

the stored program computer defining a suspend mode, an active mode, a currently active processor, and a current machine state;

at most, one processor at a time is in the active mode;

means for selecting which processor will resume the active mode as the currently active processor following a suspend mode;

means for placing a currently active processor into a suspend mode and for saving a current machine state in the shared memory;

means for placing a selected processor into an active state using the saved machine state to restore a current machine state; and means permitting a currently active processor to select which processor is placed in an active mode following a suspend mode.

6. A notebook computer, comprising:

a low-powered processor;

a high-speed processor;

a memory;

an I/O system;

the two processors sharing a common instruction set, the memory, and the I/O system and defining a stored program computer;

the stored program computer defining a suspend mode, an active mode, a currently active processor, and a current machine state;

at most, one processor at a time is in the active mode;

means for selecting which processor will resume the active mode as the currently active processor following a suspend mode;

means for placing a currently active processor into a suspend mode and for saving a current machine state in the shared memory;

means for placing a selected processor into an active state using the saved machine state to restore a current machine state;

means permitting a currently active processor to select which processor is placed in an active mode following a suspend mode; and means permitting a currently active processor to determine which processor is active.

* * * * *